(12) United States Patent
Alameh et al.

(10) Patent No.: US 9,131,060 B2
(45) Date of Patent: Sep. 8, 2015

(54) SYSTEM AND METHOD FOR ADAPTING AN ATTRIBUTE MAGNIFICATION FOR A MOBILE COMMUNICATION DEVICE

(75) Inventors: Rachid M. Alameh, Crystal Lake, IL (US); Roger W. Ady, Chicago, IL (US); William P. Alberth, Prairie Grove, IL (US); Kenneth A. Paitl, West Dundee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1201 days.

(21) Appl. No.: 12/969,792

(22) Filed: Dec. 16, 2010

(65) Prior Publication Data
US 2012/0157114 A1 Jun. 21, 2012

(51) Int. Cl.
*H04M 1/00* (2006.01)
*H04M 1/60* (2006.01)
*H04M 1/725* (2006.01)

(52) U.S. Cl.
CPC .......... *H04M 1/605* (2013.01); *H04M 1/72569* (2013.01); *H04M 2250/12* (2013.01)

(58) Field of Classification Search
USPC .................... 455/566, 569.1, 418–420, 550.1
See application file for complete search history.

(56) References Cited

U.S. PATENT DOCUMENTS

| | | | |
|---|---|---|---|
| 5,841,385 A | 11/1998 | Xie | |
| 6,853,850 B2 * | 2/2005 | Shim et al. | 455/550.1 |
| 6,915,301 B2 | 7/2005 | Hirsch | |
| 6,956,564 B1 | 10/2005 | Williams | |
| 7,076,675 B2 * | 7/2006 | Martinez Perez et al. | 713/324 |
| 7,130,705 B2 | 10/2006 | Amir et al. | |
| 7,203,911 B2 | 4/2007 | Williams | |
| 7,379,078 B1 * | 5/2008 | Gossweiler et al. | 345/660 |
| 7,555,141 B2 * | 6/2009 | Mori | 382/103 |
| 2002/0068537 A1 * | 6/2002 | Shim et al. | 455/177.1 |
| 2002/0086656 A1 | 7/2002 | Mattisson | |
| 2003/0046401 A1 | 3/2003 | Abbott et al. | |
| 2004/0225904 A1 * | 11/2004 | Perez et al. | 713/320 |
| 2004/0253994 A1 * | 12/2004 | Lampl et al. | 455/569.1 |
| 2005/0063556 A1 * | 3/2005 | McEachen et al. | 381/104 |
| 2005/0141726 A1 | 6/2005 | Houg | |
| 2005/0219228 A1 | 10/2005 | Alameh et al. | |

(Continued)

FOREIGN PATENT DOCUMENTS

| | | |
|---|---|---|
| CN | 101673173 A | 3/2010 |
| CN | 101815127 A | 8/2010 |
| JP | 5183621 A1 | 7/1993 |

OTHER PUBLICATIONS

Patent Cooperation Treaty, International Search Report and Written Opinion of the International Searching Authority for International Application No. PCT/US2011/063815, Mar. 19, 2012, 14 pages.

(Continued)

*Primary Examiner* — Brandon Miller
(74) *Attorney, Agent, or Firm* — Shumaker & Sieffert, P.A.

(57) ABSTRACT

Techniques and technologies are presented for adapting an attribute magnification for a mobile communication device. An output device for the attribute is connected to the mobile communication device. A sensor tracks distance of a user's head in relation to the mobile communication device; while a controller initiates a setting phase for magnification change and subsequently a tracking phase, opposite from the setting phase, for dynamically adjusting the attribute from the mobile communication device.

20 Claims, 10 Drawing Sheets

(56) References Cited

U.S. PATENT DOCUMENTS

| | | |
|---|---|---|
| 2006/0133623 A1 | 6/2006 | Amir et al. |
| 2007/0202858 A1 | 8/2007 | Yu |
| 2008/0049020 A1* | 2/2008 | Gusler et al. .................. 345/427 |
| 2009/0209293 A1* | 8/2009 | Louch ........................... 455/566 |
| 2009/0215439 A1* | 8/2009 | Hamilton et al. ............. 455/418 |
| 2010/0107184 A1* | 4/2010 | Shintani ......................... 725/10 |
| 2011/0126119 A1* | 5/2011 | Young et al. .................. 715/744 |
| 2011/0263241 A1* | 10/2011 | Duarte et al. ............. 455/422.1 |

OTHER PUBLICATIONS

Notification of First Office Action of Chinese application No. 201180060805.X, dated Nov. 15, 2014, 27 pp.

* cited by examiner

SYSTEM AND METHOD FOR ADAPTING AN ATTRIBUTE MAGNIFICATION FOR A MOBILE COMMUNICATION DEVICE

TECHNICAL FIELD

Embodiments of the subject matter described herein relate generally to output communication for an electronic device. More particularly, embodiments of the subject matter relate to techniques and technology for dynamically magnifying output for a mobile communication device.

BACKGROUND

Users of a mobile communication device do not remain static when operating the mobile communication device (hereinafter referred to as "the device"). Their orientation and distance relative to the device may change and the environment (for example indoors versus outdoors, time of day, device context) may change during operation of the device. Accordingly, the output of the device whether it is visual content on a display screen or audio content emanating from the device's speakers or microphone levels and filtering can be compromised (that is it becomes more difficult to see visual output or understand audio output or communicate audio into the device) based on a user's relative distance to the device, or background environment, for example.

The prior art is somewhat limited in that it does not include or contemplate effective and user-friendly techniques to adaptively maintain a user's audio and visual interface preference with her device.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
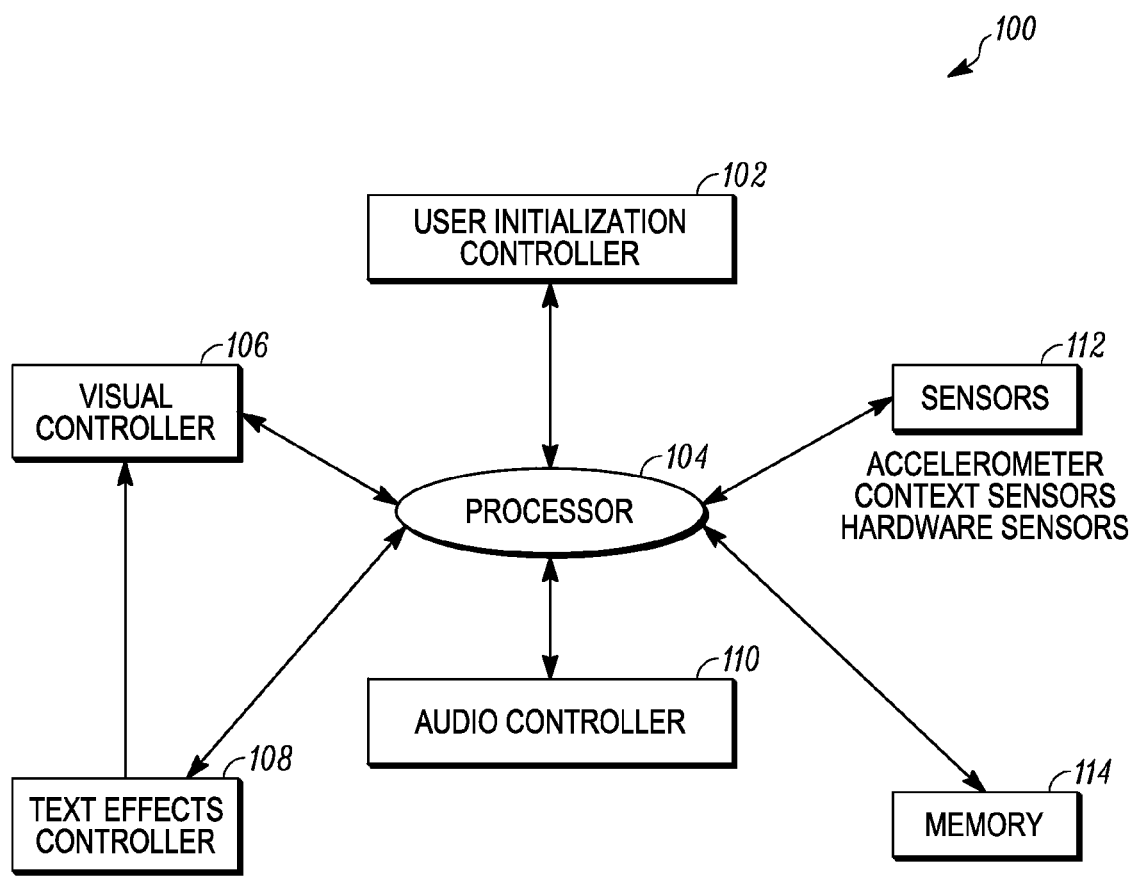
FIG. 1 is a block diagram of an exemplary embodiment of a system having one or more controllers to provide dynamic user preferred audio and visual content.

User initiates request to enable a user-preferred readability and audibility interface mode with device. There are at least three types of controls for example, visual, audio (speaker and microphone) and text formats. Three phases are disclosed herein: initiating, setting, and tracking phases. The visual content magnification and audible level setting and tracking phases behave opposite to one another to counter device-user subsequent relative spacing changes following the setting phase, thus maintaining preferred user set interface. The text format and audio spectral selections are previously set and stored in device (different profiles can be stored by a factory) and are selected during the tracking phase based on sensor outputs at the time. In other words, the visual setting is driven by device user-relative positions (spacing and orientation).

The audio level setting can also be driven by device-user relative positions (e.g., spacing and orientations). The audio equalization and spectral changes are selected from a group of profiles stored in a phone, for example, for various user/device spacing, device context and environment conditions. In this vein, audio filtering can be done by assessing an output from a sensor and change spectral content of the audio, such as increased bass or treble, increased low or high frequency content for user-preferred audio intelligibility within a noisy environment. An imager can detect the presence of a hearing aid, thereby a controller adaptively changes the acoustic content according to a stored audio profile within the mobile communication device, wherein the audio profile includes volume level, audio spectrum, audio filtering, and audio directional steering.

The text formats are selected from a group of profiles stored in a phone (during factory setting) for various user/device spacing, device context and environment conditions. During the tracking phase, and based on changing sensor outputs, a best match with stored profiles is determined and selected for use. If sensor outputs and device context continue to change during tracking, other profiles are selected in an adaptive way accordingly. At the end of the call or device session, a device can go back to normal default mode. User can also manually select from various stored profiles irrespective of sensor readings and live detections. In the case an imager is used for determining eye gaze direction, i.e., a user's looking direction relative to the device is assessed and if determined that the user is averting her gaze from the display, the display is turned off for privacy and power saving. An imager can also be used to detect the presence of prescription glasses and or hearing aids (when user is looking away from the device the camera may have a view of a hearing aid) and use that to adjust best interface profiles accordingly. For example, an output from the imager may cause a controller to mute a microphone of a mobile communication device. An imager can also be combined with a range estimator.

During the setting phase, user can set one type (i.e. visual) or cycle through various controls to set other types (i.e. audio, text).

The initiating of the best interface mode is done with a button press, sensor detect, voice or gesturing on device or with device. The selection of setting preference is done via voice command, holding device motionless for a period of time, gesturing in front of device's display or with the device itself, blinking an eye (image recognition), gesturing with head or other handsfree gestures, tapping phone, etc.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions, and the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Referring now to the drawings, FIG. 1 is a block diagram of an exemplary embodiment of a system 100 having a user initialization controller 102. The user initialization controller 102 is suitably configured to communicate and perform data transfer with a processor 104. Processor 104 can also be communicatively coupled to a visual controller 106, a text effects controller 108, and an audio controller 110, wherein the audio controller 110 affects audio volume level, audio equalization, audio filtering, and audio directional steering. In addition, processor 104 is also coupled to one or more sensors 112, for example accelerometers, GPS, sensors (e.g., capacitive touch, proximity), and hardware sensors such as infrared and ultrasonic sensors. A memory 114 can also be communicatively coupled to processor 104 for storing user preferences for output of visual and audio content and user profiles.

It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the respective process as long as the intended overall functionality remains intact.

An attribute as defined herein means either an audio or visual effect.

Magnification as defined herein can be considered as enlargement or intensification of either an audio or visual attribute. Reduction is the opposite of magnification and is defined herein as shrinking or lessening of an audio or visual attribute.

A first sensor or set of sensors as used herein assesses the user and the device's relative position, orientation, and angle.

A second sensor or set of sensors as used herein detect the device context and operating mode, tilt, environment, time of day, prior use, speed, elevation, humidity, visible light, sunlight, and other weather-related conditions.

Figure 2:
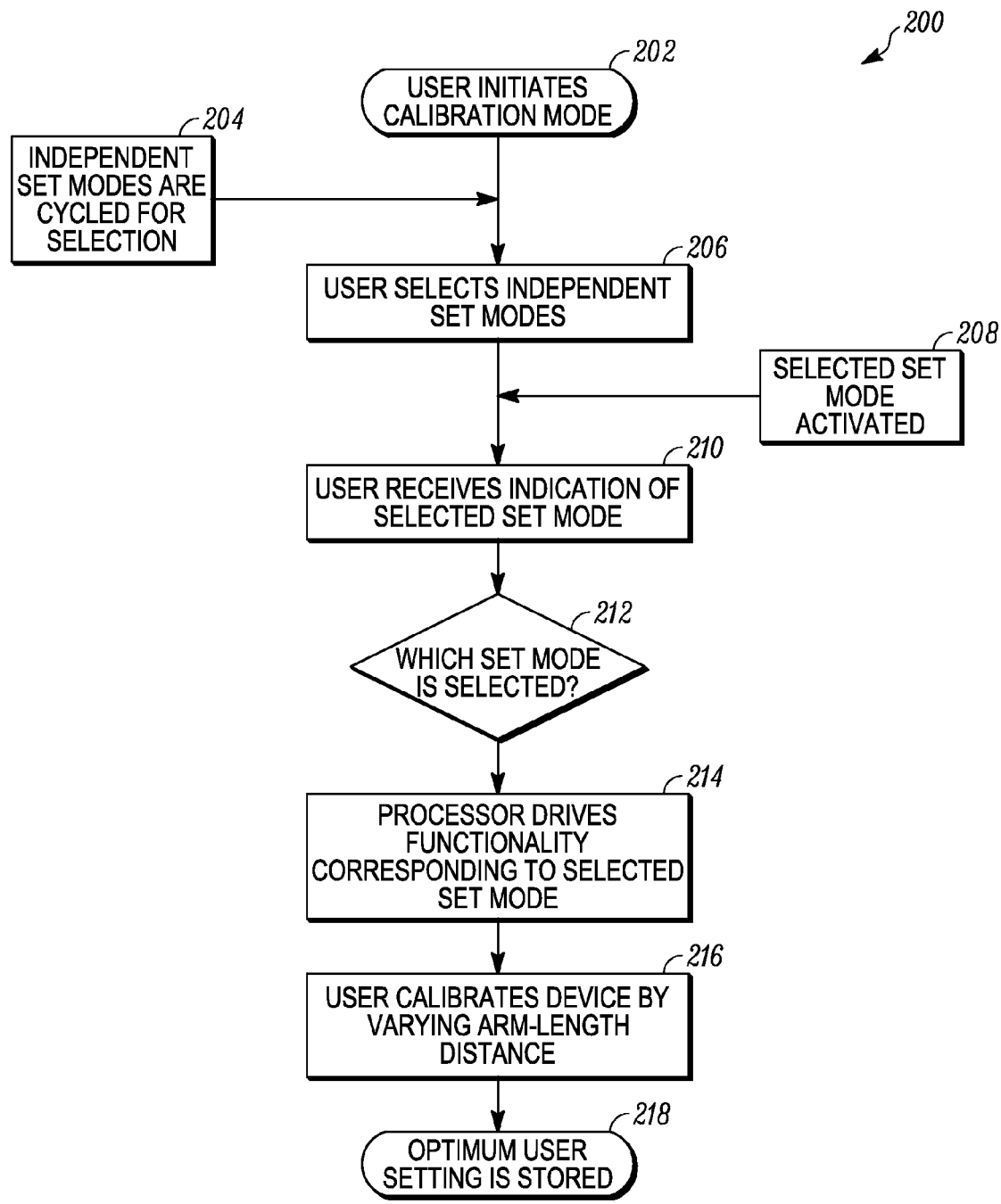
FIG. 2 is a flow chart that illustrates an exemplary embodiment of an initializing process.

In this regard, FIG. 2 is a flow chart that illustrates an exemplary embodiment of a processor or network server operating process 200. The process 200 may be performed by a network server or processor 104 (as described earlier in FIG. 1). A user can initiate the calibration mode in task 202. The user may press a button, or activate a touchscreen, issue a voice command, perform a gesture on or near the device, perform a gesture with device, or activate a sensor to cause initiation and indicate that device is in such a mode. The process 200 may cycle independent set modes, visual, audible, and text format in task 204. In task 206 the user selects one or more of the independent set modes that were previously cycled. Thereafter, the selected set mode is activated via task 208. The process 200 continues wherein the user receives an indication of the selected set mode in task 210. An inquiry by the processor in task 212 determines which set mode has been selected. Depending on the selected set mode, one or more functionalities are driven by the processor. (task 214) For example, a graphics interface may be driven to project images, text, and numbers to the user.

Task 216 enables a user to calibrate device by varying her arm-length distance or orientating her head, relative to the display screen, in a different manner. The preferred distance can be set by dwelling or holding at a distance for a specific time period, activating a voice command, or other input control methods. The preferable user setting is stored in task 218 of the process 200.

Figure 3:
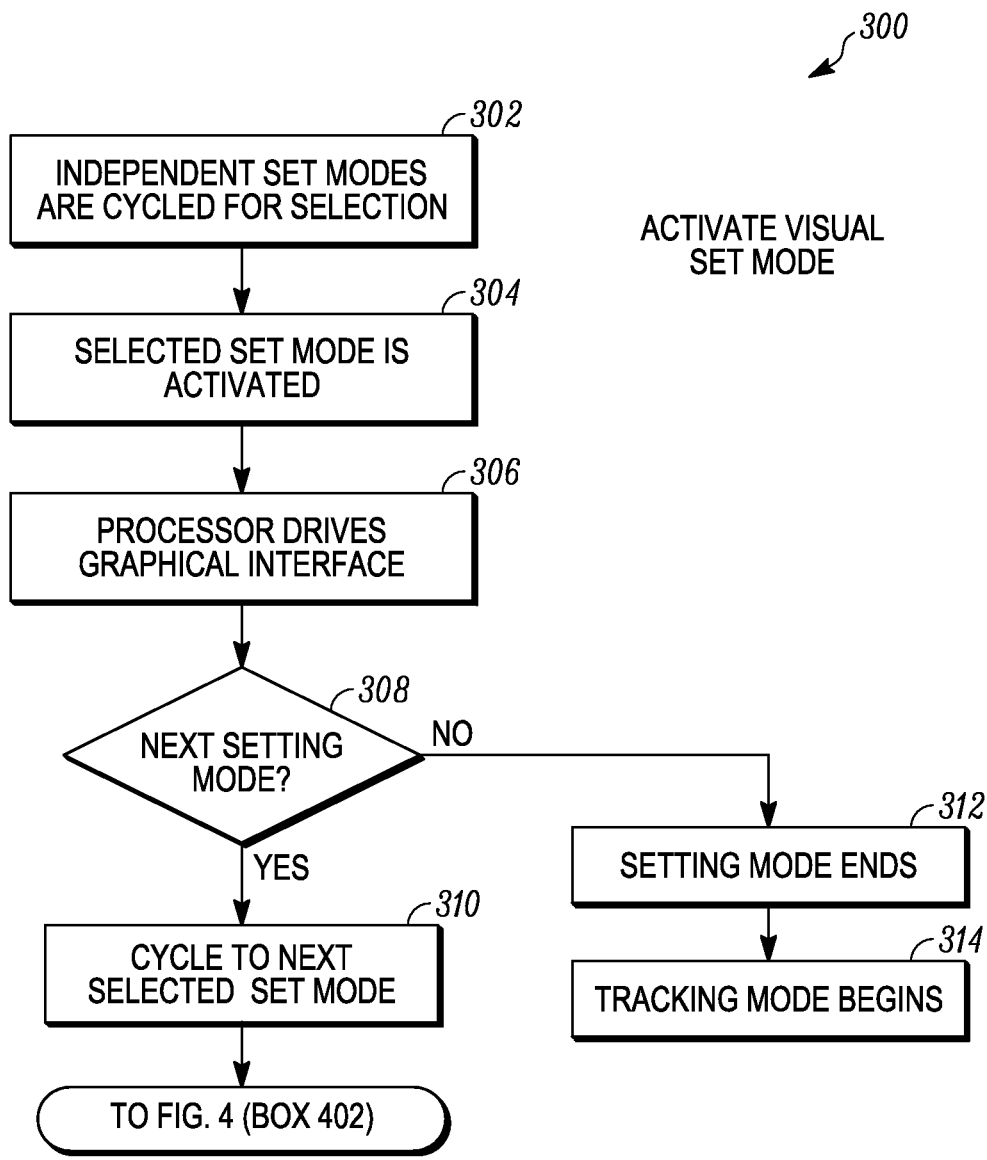
FIG. 3 is a flow chart that illustrates an exemplary embodiment of an active visual set mode process; have problem with FIG. 3

Referring to FIG. 3, the process 300 may be performed by a network server or processor 104 (as described earlier in FIG. 1). In this regard, the process 300 activates the visual set mode. In certain embodiments, the process 300 cycles independent set modes for selection in task 302.

The process 300 continues by activating the selected set mode from above in task 304. A graphics interface is driven by the processor in task 306. The graphics interface can be used to project images, text, and numbers to the user as a graphical interface.

An inquiry is made by task 308 on whether to continue to another setting mode, for example, audio or text. If the user desires to start another setting mode, task 310 cycles the next selected set mode for the user, and continues back to task 306. Otherwise, the setting modes are ended in task 312; whereupon task 314 begins the tracking mode.

Audio level can be set similarly as the font size magnification was set and described above. A user can hear a tone from the device and uses the tone while moving the device either further or closer to determine the preferred level of audibility. The audio level setting phases are similar to the font size setting phases which include a setting phase and tracking phase based on the ability of the user to move the device. Once the user preferred audio level is set, the device operational modes and sensors are used to select one of many stored audio profiles for optimum audio spectral content and filtering techniques to improve audio intelligibility within the current environment that the device is used in.

Figure 4:
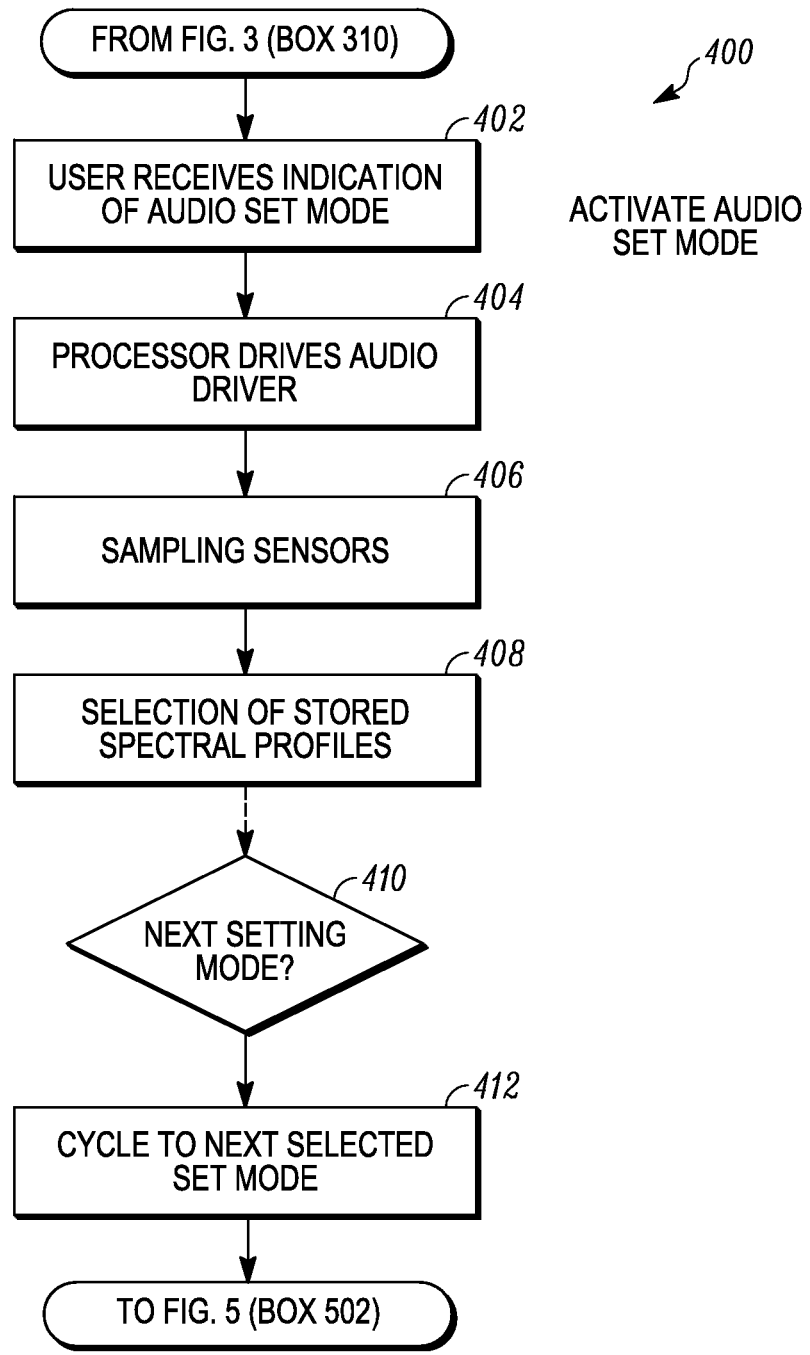
FIG. 4 is a flow chart that illustrates an exemplary embodiment of an active audio set mode process

FIG. 4 is a flow chart that illustrates an exemplary embodiment of activating the audio set mode with process 400. The process 400 may begin by communicating an indication to the user of the audio set mode being available in task 402. The processor 104 drives an audio driver or controller to output audio (such as tone, speech, music, spectral content) in task 404. The audio controller affects audio volume level, audio equalization, audio filtering, and audio directional steering. Audio output of the mobile communication device can be altered based on the context of the mobile communication device, said audio output alteration can include adaptive acoustical spectrum change in contrast to an environmental presence of the mobile communication device.

The audio controller or driver can operate in one or more predefined time windows. Sampling of sensors is performed by task 406.

Task 408 selects one or more stored spectral profiles. Near the end of the process 400, task 410 inquires whether to proceed to the next setting mode. If affirmative, task 412 cycles to the next selected set mode. Otherwise, the setting mode ends and the tracking mode begins (not shown in FIG. 4).

Figure 5:
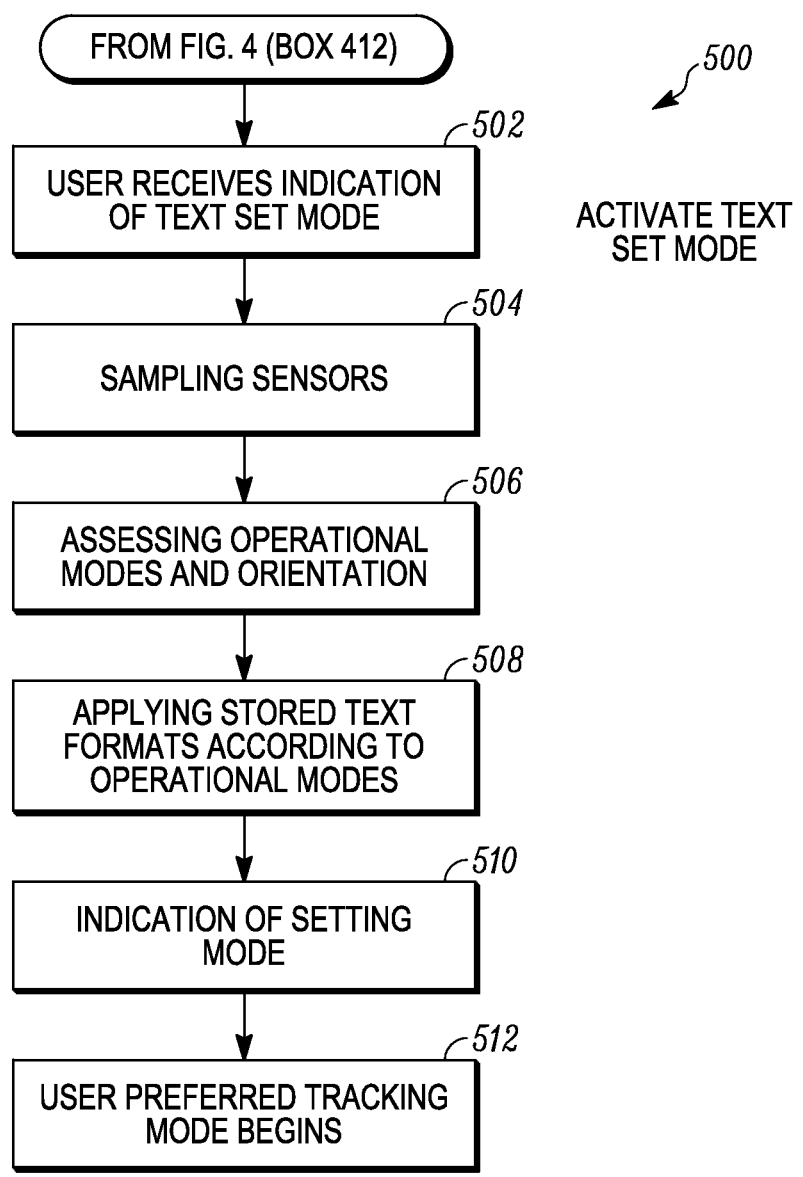
FIG. 5 is a flow chart that illustrates an exemplary embodiment of an active text set mode process.

FIG. 5 is a flow chart that illustrates an exemplary embodiment of activating the text set mode with process 500. The illustrated embodiment of the process 500 begins with task 502 communicating an indication, for receipt by the user, of the text set mode being available. Task 504 samples information from context sensors for device background conditions and environmental conditions, such as lighting. In addition, task 504 samples sensors of the device that may include darkness, sunlight, time of day, location, orientation, movement, speed, and device use mode, for example.

Operational modes and device orientation are assessed by task 506. Processor 104 may use input from sensors such as infrared (IR), imagers, ultrasound, touch, accelerometer, elevation, speed, and other sensors useful to determine device operational mode and device context. That determination is used to set certain text formats based on previously stored models and profiles in device for a variety of operation and context modes. Upon assessing the operational modes, stored text formats can be applied in task 508. Text formats can include color, backlight color, dynamically improving background to text contrast, 3D effects, bolding, capitalizing, embossing, engraving, font type, and font size, for example. The aforementioned list of text formats is not exhaustive, but is illustrative. In addition, text formats can also include 3D depth-effects, shadowing, underlining, italicizing, capitalization, text color, text color relative to display backlight color, text color relative to external background, display backlight color relative to external background, text spacing, font type, and text sizing.

An indication of the end of the setting mode is performed by task 510. Task 512 begins the user preferred tracking mode.

Figure 6:
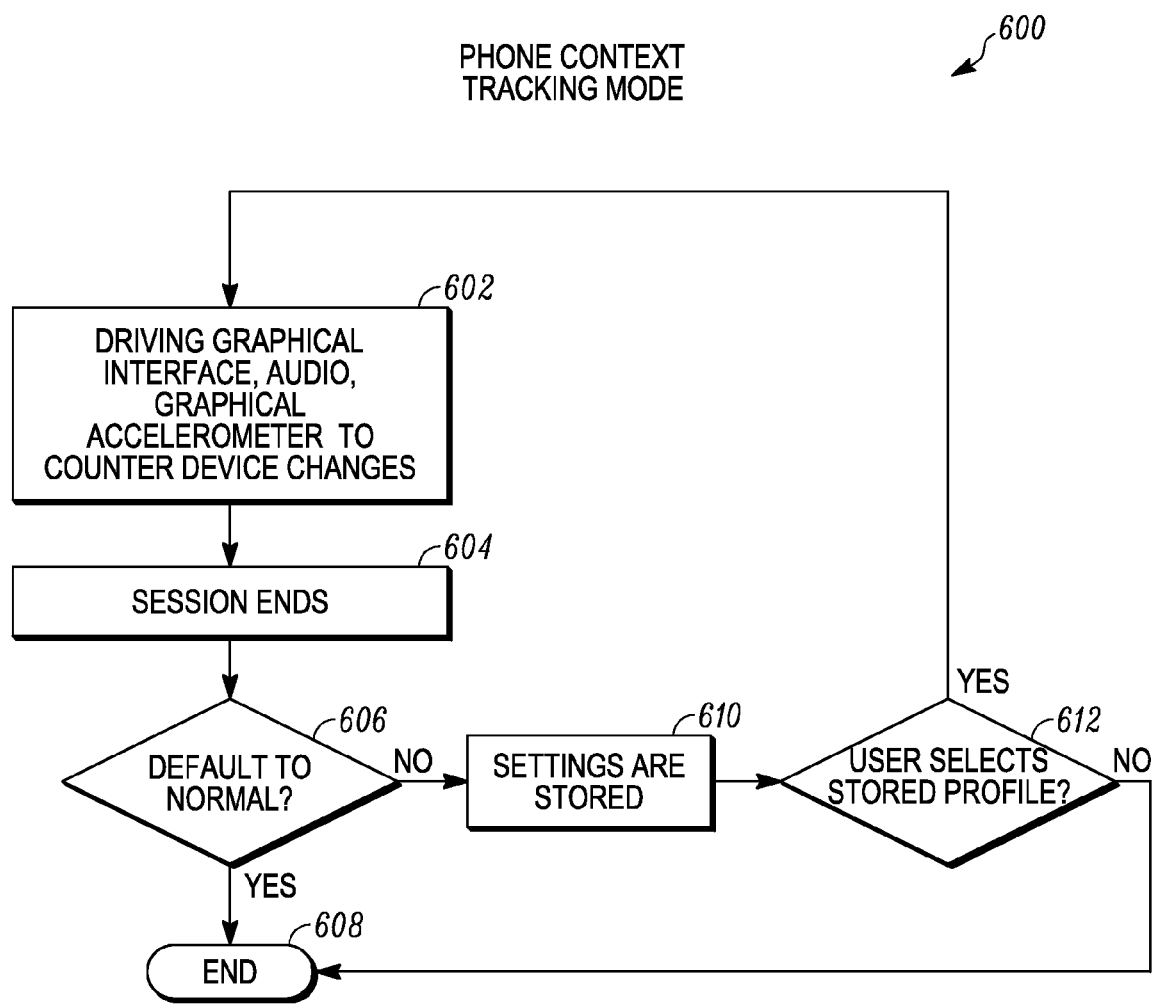
FIG. 6 is a flow chart that illustrates an exemplary embodiment of a phone context tracking mode process.

Upon the start of the tracking mode, the device context changes. In this regard, FIG. 6 illustrates an exemplary process 600 of the context changing for a device during the tracking mode, such as a mobile communication device (i.e., phone, tablet, PDA). Task 602 uses processor 104 to drive one or more of the following components: a graphical interface, an audio driver, or a graphical accelerator to counter device changes subsequent to the setting mode. These driven components will enable the device to maintain the user preferred visual, audio, and text interface selected during the setting mode. For example, during the tracking mode, as the device moves away from a pre-established reference point, the volume may increase and there may be magnification (or demagnification) of fonts, images, and texts which will cause a change in the opposite direction from the setting mode.

Task 604 ends the session, whereupon task 606 inquires whether the device should default to "normal" settings, i.e., settings that do not include the user's preferences as determined during the setting mode. If affirmative, task 608 ends session. Otherwise, task 610 stores the settings and provides an opportunity for the user to select the stored profile in task 612. These stored profiles can thereafter be used to drive the graphical interface, audio driver, and graphical accelerator. The user can have many stored profiles based on location, time of day, environments, vision that may or may not include glasses and audio that may or may not include hearing aid devices. Thus, when the user is in the same environment she is able to pick from previously stored profiles that are applicable to her preferences. The stored profiles best matching the device context and/or operational modes are also ranked and made more readily available when the device is detected to be in a matching or similar environment, for example a beach or a museum; wherein a beach profile has been previously stored in the device. Alternatively, a device's prior use history can be stored and recalled as well.

Figure 7:
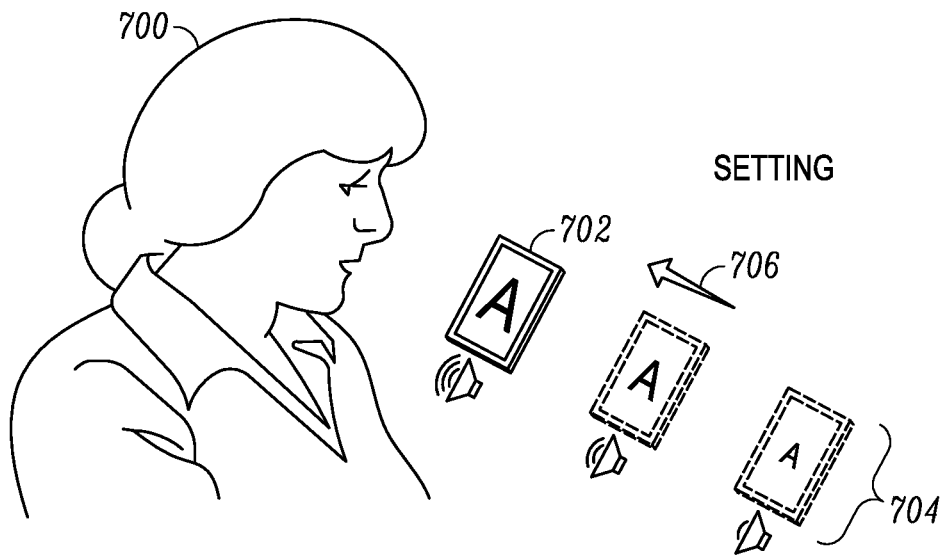
FIG. 7 is an exemplary illustration of a method to setting user-preferred magnification.

Referring to FIG. 7 an exemplary method of setting a user-preferred magnification is shown. Hereinafter, the terms "setting phase" and "tracking phase" are used interchangeably with "setting mode" and "tracking mode". When the user 700 moves the device 702 closer to her head or when the device-to-user distance decreases, the magnification 704 on a display of the device 702 (or in some cases the character font size) increases. This movement 706 can be thought of as emulating the natural phenomena of moving a paper with writing on it closer to one's eye to see the writing more clearly, because the letters appear larger. Moreover, the starting point for the user to begin moving the device closer to set the magnification preference is arbitrary. That is to set a displayed font size, the user begins moving the device closer from the arbitrary point in space. Alternatively, the setting phase described above could be reversed from the natural or inherent movement. An example, in the setting phase the user would move the device closer to reduce the font or move the device further away to increase the font.

Figure 8:
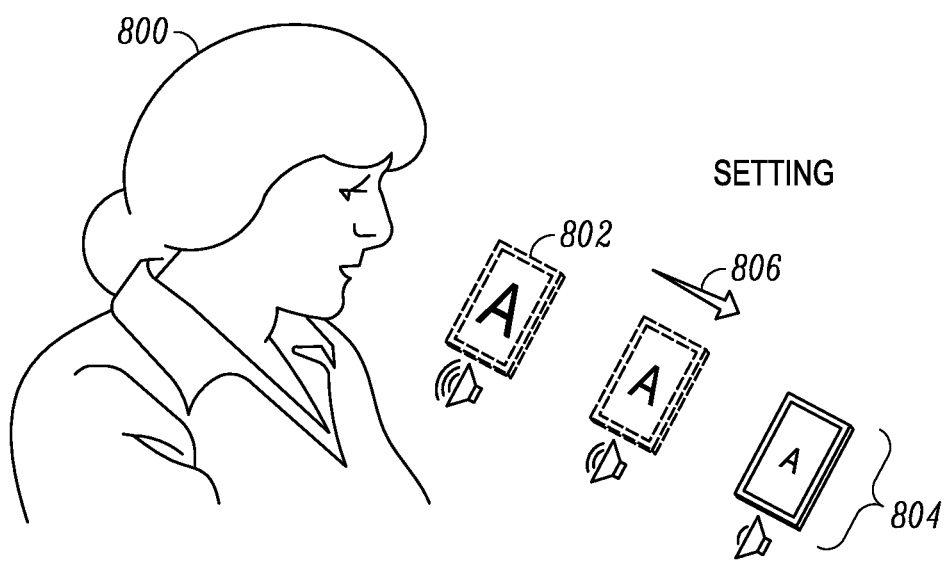
FIG. 8 is an exemplary illustration of method to setting user-preferred magnification while device is being moved in an opposite direction from FIG. 7.

Referring to FIG. 8, another exemplary method of setting a user-preferred magnification is shown. FIG. 8 is the setting phase in the opposite direction of what is shown in FIG. 7. Font size changes can be limited within a predetermined range during the movement so that the user has a more manageable control of the magnification. For example, a maximum range of font size change can be within sizes 8-14 as the user-device distance varies. FIG. 8 includes a user 800 with a device display 802 having a set of dynamically changing characters 804 based on movement 806.

Figure 9:
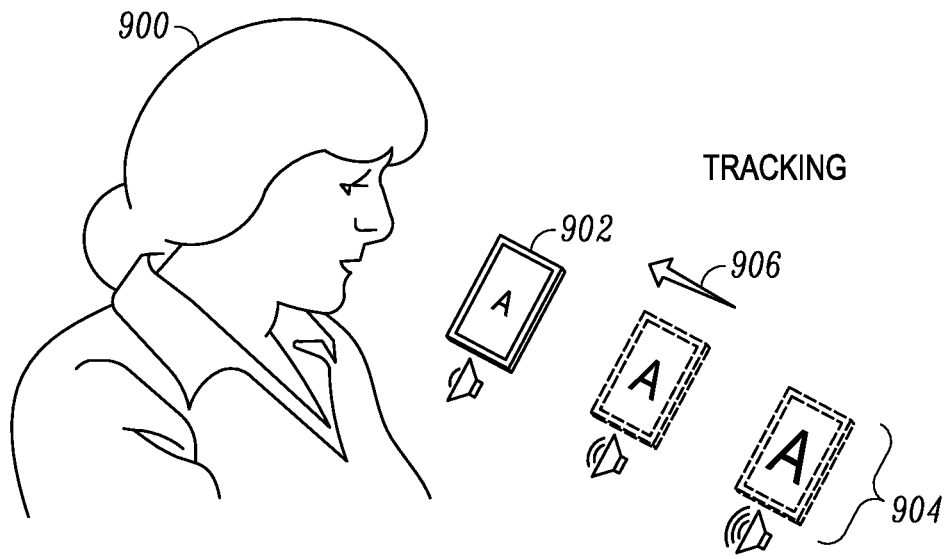
FIG. 9 is an exemplary illustration of a method for tracking user-preferred magnification in accordance with figure to maintain user preferred setting.
Figure 10:
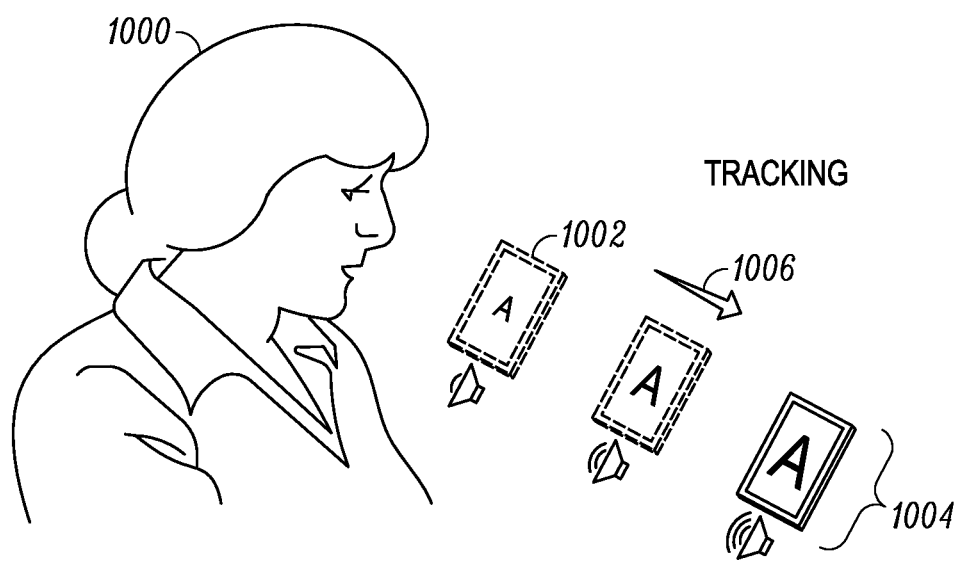
FIG. 10 is an exemplary illustration of a method for tracking user-preferred magnification while device is being moved in a opposite direction from FIG. 9.

Referring to FIGS. 9 and 10, an exemplary illustration of a method for tracking user-preferred magnification is shown. During the tracking phase the device compensates for the changing distance between the user and the device, therefore, the tracking phase acts opposite from the setting phase. Specifically, if the setting phase increases magnification based on device directional movement, the tracking phase decreases magnification and vise versa.

In FIG. 9, for example, having completed the setting phase, the device switches to the tracking phase, where the magnification is reduced as the device is brought closer to the user.

FIG. 9 includes a user 900 with a device display 902 having a set of dynamically changing characters 904 based on movement 906.

In FIG. 10, for example, having completed the setting phase, the device switches to the tracking phase, where the magnification is increased as the device is moved away from the user. FIG. 10 includes a user 1000 with a device display 1002 having a set of dynamically changing characters 1004 based on movement 1006.

Notably, the tracking phase in FIGS. 9 &10 could reverse direction, if the setting phase shown in FIGS. 7 & 8 also shows reduction of a character font size, for example.

Figure 11:
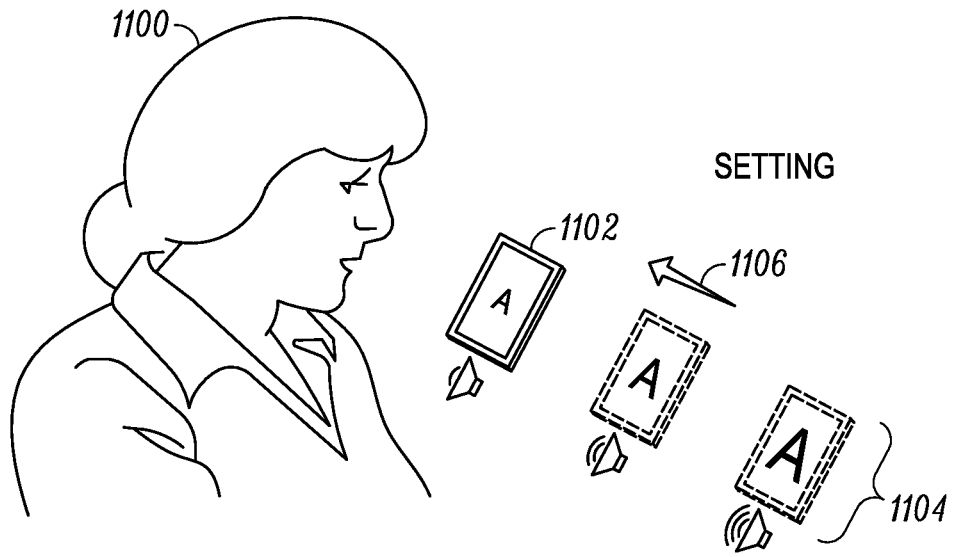
FIG. 11 is an exemplary illustration of a method for setting user-preferred reduction one.

Reduction of a larger character font is shown for another example of a setting phase in FIG. 11. FIG. 11 includes a user 1100 with a device display 1102 having a set of dynamically changing characters 1104 based on movement 1106.

Figure 12:
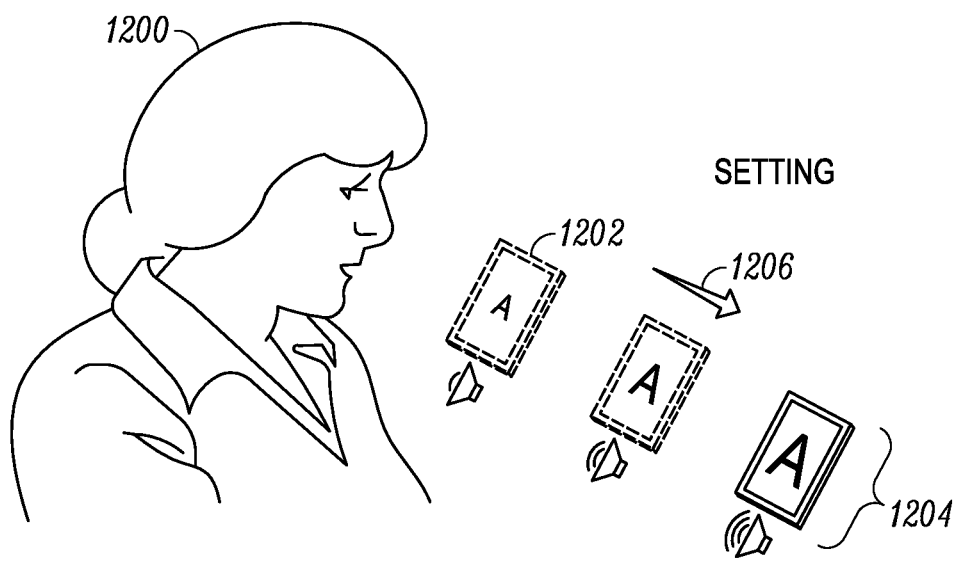
FIG. 12 is an exemplary illustration of a method for setting user-preferred reduction in another direction.

Reduction of a larger character font is shown for a setting phase in an opposite direction is shown in FIG. 12. FIG. 12 includes a user 1200 with a device display 1202 having a set of dynamically changing characters 1204 based on movement 1206.

Figure 13:
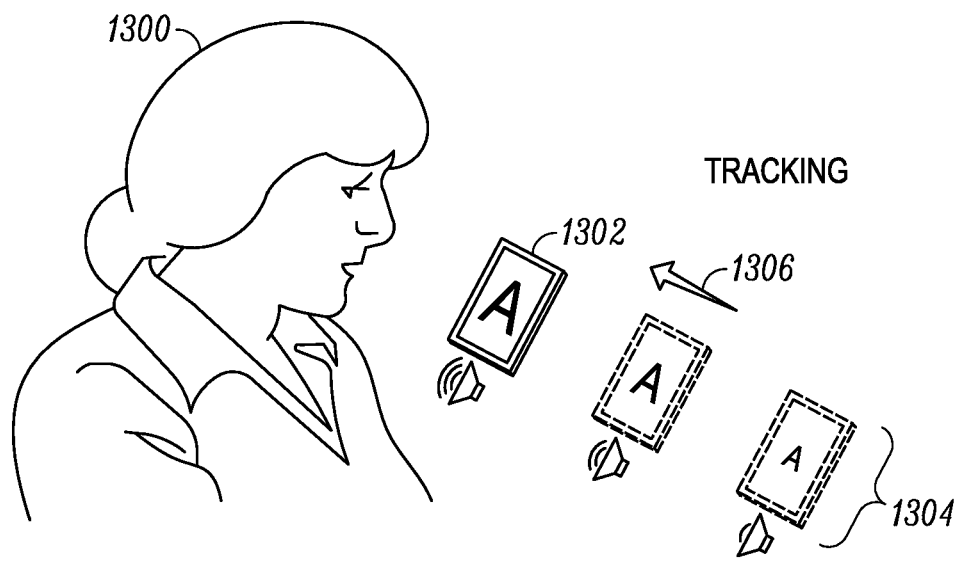
FIG. 13 is an exemplary illustration of a method for tracking user-preferred reduction in one direction.
Figure 14:
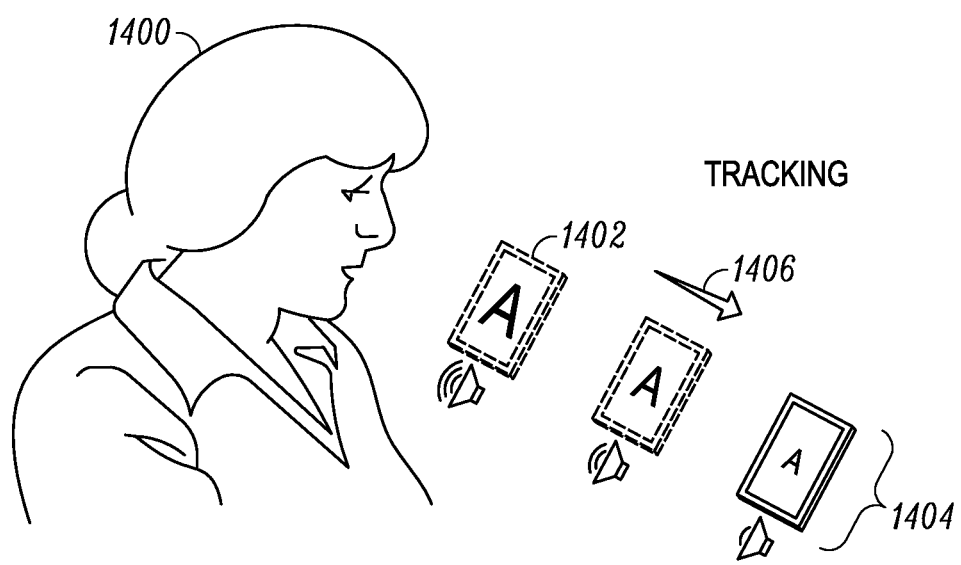
FIG. 14 is an exemplary illustration of a method for tracking user-preferred reduction in another direction.

As a result, FIGS. 13 & 14 show corresponding tracking phases in relation to FIGS. 11 & 12, respectively. FIG. 13 includes a user 1300 with a device display 1302 having a set of dynamically changing characters 1304 based on movement 1306. Likewise, FIG. 14 includes a user 1400 with a device display 1402 having a set of dynamically changing characters 1404 based on movement 1406.

A user may navigate through visual, audio, and text format changes to affect her preferences for her device. A user may or may not employ the visual, audio, or text format setting and tracking phases at one time. The user can be prompted to navigate from one setting phase to another, for example, from visual to audio to text formats. However, the order of navigation is not fixed and can be selectively changed by the user.

While at least one exemplary embodiment has been presented in the foregoing detailed description, it should be appreciated that a vast number of variations exist. For example, the dynamically changed characters in FIGS. 7-14 can be text or symbolic icons that may indicate audio levels. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system configured to adapt a magnification of an attribute for a mobile communication device, comprising:
    an output device, the output device being connected to the mobile communication device;
    a first sensor configured to track a distance of at least a part of a head of a user relative to the mobile communication device; and
    a controller configured to:
        initiate a setting phase for magnification change, the setting phase configuring a magnitude of the attribute based on an initial configuration provided by the user, and the setting phase being different than a tracking phase, and
        after initiating the setting phase, initiate a tracking phase for dynamically adjusting the magnitude of the attribute relative to the initial configuration provided by the user in the setting phase while a change in a distance is detected by the mobile communication device between the head of the user and the mobile communication device,
        wherein a change in dynamically adjusting the attribute during the tracking phase is opposite to a change in dynamically adjusting the attribute during the setting phase.

2. The system claimed in claim 1, wherein the attribute includes at least an audio portion and wherein the output device is a speaker at least partially controlled by the mobile communication device.

3. The system claimed in claim 2, further comprising one or more sensors that determine:
    a context of the mobile communication device, the context comprising external environment, movement, orientation, GPS location, altitude, operational mode, and user-to-device relative position that is based at least in part on distance and angle;
    wherein the controller affects audio volume level, audio equalization, audio filtering, and audio directional steering, and
    wherein the audio portion is determined based at least in part on the context of the mobile communication device.

4. The system claimed in claim 1, wherein the attribute includes at least a visual portion and wherein the output device is a display at least partially controlled by the mobile communication device.

5. The system claimed in claim 4, wherein the attribute is a character size presented on the display.

6. The system claimed in claim 1, wherein the first sensor is a proximity detector capable of detecting at least one dimension in physical space.

7. The system claimed in claim 1, wherein the first sensor is at least an imager.

8. The system claimed in claim 7, wherein the first sensor is a combination of the imager and at least one range estimator capable of detecting at least one dimension in physical space, wherein the range estimator uses at least one of infrared or ultrasound.

9. The system claimed in claim 7, wherein the imager detects the presence of a hearing aid and a user's focused eye gaze or looking direction relative to the mobile communication device.

10. The system claimed in claim 9, wherein upon the imager's detection of an averted eye gaze, the controller mutes a microphone of the mobile communication device.

11. The system claimed in claim 9, wherein upon the imager's detection of presence of the hearing aid, the controller adaptively changes an acoustic content according to a stored audio profile within the mobile communication device, wherein the audio profile includes volume level, audio spectrum, audio filtering, and audio directional steering.

12. The system claimed in claim 1, wherein the controller receives an input to initialize the setting phase.

13. The system claimed in claim 12, wherein the setting phase includes sensing a relative location of the user's head with respect to the mobile communication device.

14. The system claimed in claim 13, wherein the relative location of the user's head relative to the mobile communication device encompasses distance and an angular position relative to a normal position, the normal position being relative to the mobile communication device.

15. The system claimed in claim 1, wherein the controller receives an input that finalizes the setting phase and initiates the tracking phase.

16. The system claimed in claim 15, wherein the input for initializing the tracking phase includes, from the mobile communication device, at least one of an accelerometer signal, a manual selection, a handsfree gesture, a device gesture, or a voice command.

17. The system claimed in claim 16, wherein the accelerometer signal of the mobile device is coupled with a predetermined time period for switching from the setting phase to the tracking phase.

18. The system claimed in claim 1, further comprising the controller affecting content presentation on the display based on one or more sensors that determine:
- a context of the mobile communication device;
- a device operational mode, the context comprising orientation of the mobile communication device;
- an operation of the mobile communication device;
- a movement of the mobile communication device;
- an environmental condition in which the mobile communication device is operating;
- a device use prior history; and
- a relative location of at least one of the user, the head of the user, or the eyes of the user, relative to the mobile communication device.

19. The system claimed in claim 18, wherein text formats are dynamically changed depending on an output of the first sensor of the mobile communication device, the text formats selected from a group consisting of: 3D depth-effects, embossing, bolding, shadowing, underlining, italicizing, capitalization, text color, text color relative to display backlight color, text color relative to external background, display backlight color relative to external background, text spacing, font type, and text sizing.

20. The system claimed in claim 1, wherein the attribute includes at least an audio portion and wherein input device is a microphone at least partially controlled by the mobile communication device.

* * * * *